US009621536B2

(12) United States Patent
Fardig et al.

(10) Patent No.: US 9,621,536 B2
(45) Date of Patent: *Apr. 11, 2017

(54) ANTICIPATORY SINGLE SIGN-ON (SSO) FOR PROXIED WEB APPLICATIONS

(71) Applicant: Lenovo (Singapore) Pte. Ltd., Singapore (SG)

(72) Inventors: Matthew William Fardig, Boonville, IN (US); Riley G. Branch, Eagle Mountain, UT (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 20 days.

This patent is subject to a terminal disclaimer.

(21) Appl. No.: 14/539,323

(22) Filed: Nov. 12, 2014

(65) Prior Publication Data

US 2016/0134618 A1 May 12, 2016

(51) Int. Cl.
*G06F 7/04* (2006.01)
*H04L 29/06* (2006.01)
*H04L 29/08* (2006.01)

(52) U.S. Cl.
CPC ......... *H04L 63/0815* (2013.01); *H04L 67/02* (2013.01); *H04L 67/28* (2013.01)

(58) Field of Classification Search
CPC . H04L 63/0281; H04L 63/0815; H04L 67/02; H04L 67/28

USPC ............................................. 726/8
See application file for complete search history.

(56) References Cited

U.S. PATENT DOCUMENTS

| 8,806,142 B2 * | 8/2014 | Allen | G06F 12/0862 711/118 |
| 8,863,246 B2 * | 10/2014 | Norman | 713/168 |
| 9,002,828 B2 * | 4/2015 | Fiatal | G06F 17/30106 707/721 |
| 2004/0123144 A1 * | 6/2004 | Chan | H04L 63/0815 726/8 |
| 2013/0298209 A1 * | 11/2013 | Targali | H04L 63/0815 726/6 |
| 2014/0250511 A1 * | 9/2014 | Kendall | H04L 63/0815 726/6 |

* cited by examiner

*Primary Examiner* — Samson Lemma
(74) *Attorney, Agent, or Firm* — Ference & Associates LLC

(57) ABSTRACT

One embodiment provides a method, including: receiving, from an end user device, authentication data of a user of a web service; storing, in a single sign-on service, data for authenticating the user to the web service; receiving, at the single sign-on service, one or more initiations for the web service from the user; generating, using a processor, anticipatory sign-on data for the user based on the one or more initiations for the web service; and storing, at the single sign-on service, the anticipatory sign-on data. Other aspects are described and claimed.

20 Claims, 3 Drawing Sheets

ANTICIPATORY SINGLE SIGN-ON (SSO) FOR PROXIED WEB APPLICATIONS

BACKGROUND

Single sign-on (SSO) to web services (e.g., web sites, web applications, etc.) is currently available and is increasingly being adopted. By way of example, in conventional systems, an SSO service proxies web sites that require a sign-on by a user, e.g., a log-in page that secures access to additional, authenticated post log-in pages. When a user authenticates to the SSO service and requests a web site, the SSO service provides the user's log-in credentials/authentication data to the flow, as the SSO service has previously stored the necessary data for doing so. This provides a single sign-on capability, i.e., the user need only authenticate to the SSO service, which handles remaining log-ins for the web services. The user may configure the SSO service, e.g., give it user access credentials for various web services.

BRIEF SUMMARY

In summary, one aspect provides a method, comprising: receiving, from an end user device, authentication data of a user of a web service; storing, in a single sign-on service, data for authenticating the user to the web service; receiving, at the single sign-on service, one or more initiations for the web service from the user; generating, using a processor, anticipatory sign-on data for the user based on the one or more initiations for the web service; and storing, at the single sign-on service, the anticipatory sign-on data.

Another aspect provides an information handling device, comprising: a processor; and a memory device that stores instructions executable by the processor to: receive, from an end user device, authentication data of a user of a web service; store, in a single sign-on service, data for authenticating the user to the web service; receive, at the single sign-on service, one or more initiations for the web service from the user; generate, using a processor, anticipatory sign-on data for the user based on the one or more initiations for the web service; and store, at the single sign-on service, the anticipatory sign-on data.

A further aspect provides a product, comprising: a storage device having code stored therewith, the code being executable by a processor and comprising: code that receives, from an end user device, authentication data of a user of a web service; code that stores, in a single sign-on service, data for authenticating the user to the web service; code that receives, at the single sign-on service, one or more initiations for the web service from the user; code that generates, using a processor, anticipatory sign-on data for the user based on the one or more initiations for the web service; and code that stores, at the single sign-on service, the anticipatory sign-on data.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
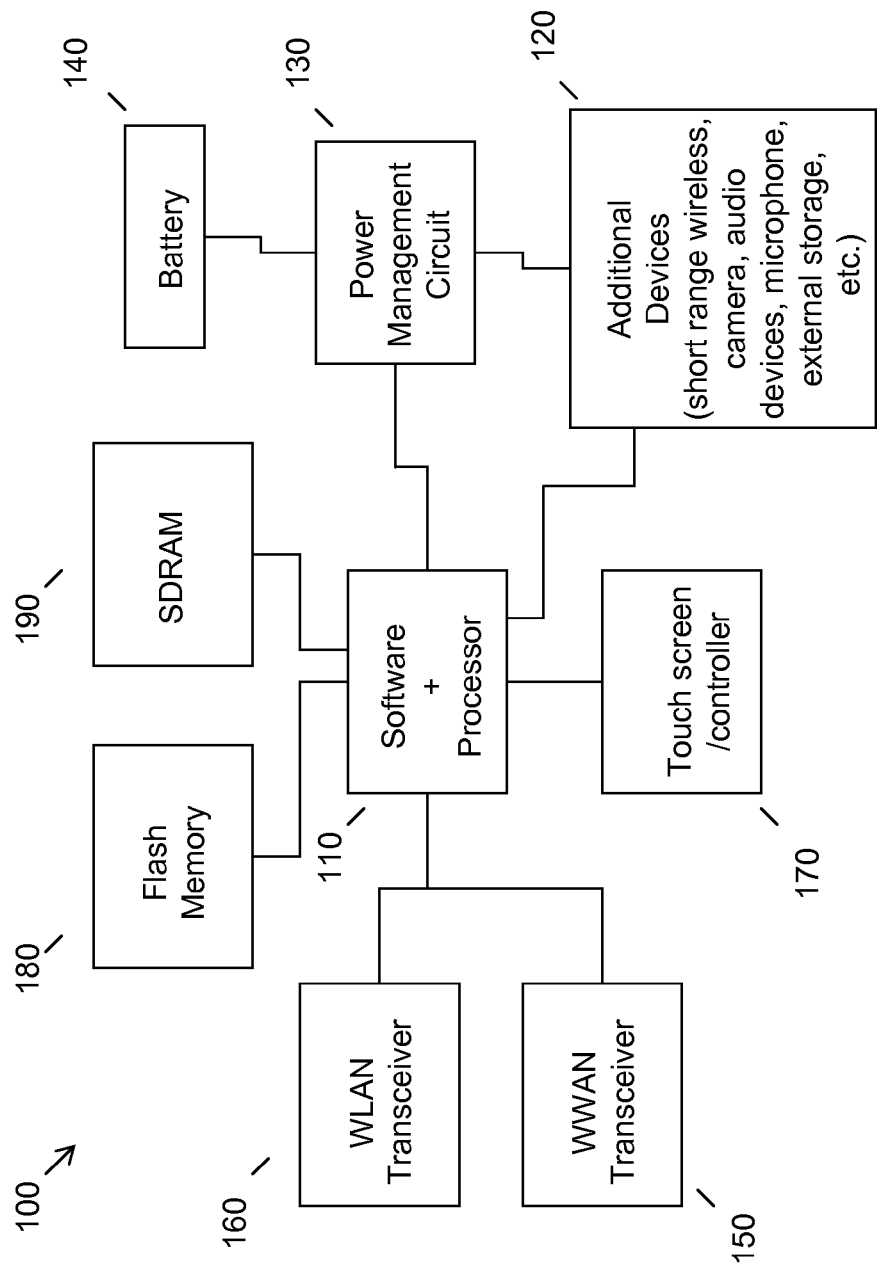
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In conventional SSO services, the target web service (i.e., web site requiring login) is proxied behind a server. When an SSO service request is initiated by the user for a web site, the server requests the target web site for the user. Credentials required by the web site are then provided to the web site by the server, which are submitted back to the target web site for authentication. In this situation, the user is benefited by never having to log-in to the web site, as this is handled by the SSO service and the user need not even see the log-in page.

The target web site processes the authentication and returns an authenticated page, e.g., a post log-in page. The SSO service then transmits that page from the server to the user (client device/end user device). The user that initiated the process thus has to wait while the SSO service and the target web site exchange information before the user is presented with the authenticated page.

This results in some instances in a slower than expected user experience because each application or service that is initiated via the SSO service by the user must launched (e.g., clicked on) and a sign in performed by the SSO service (via the target web site). The end user must wait for these steps to be performed prior to being served with the authenticated page. Moreover, to accomplish a given task or set of tasks, an end user might have to retrieve several authenticated pages from different web services via the SSO, multiplying the waiting time with each such request. That is, the end user must wait while each application is individually signed into, etc.

Accordingly, an embodiment addresses these technical problems by providing an anticipatory SSO service. An embodiment permits automated pre-authentication to web services via an SSO service such that user wait times are reduced. Compared to conventional approaches, an embodiment implements a technical solution that enables anticipatory authentication to services based on a variety of characteristics of the user, characteristics of the web services, or a combination of the foregoing.

The illustrated example embodiments will be best understood by reference to the figures. The following description is intended only by way of example, and simply illustrates certain example embodiments.

While various other circuits, circuitry or components may be utilized in information handling devices, such as an end user or client device, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., devices that are used to provide input, provide output, provide additional storage, and the like. System 100 often includes a touch screen 170 for data input and display/rendering. System 100 also typically includes various memory devices, for example flash memory 180 and SDRAM 190.

Figure 2:
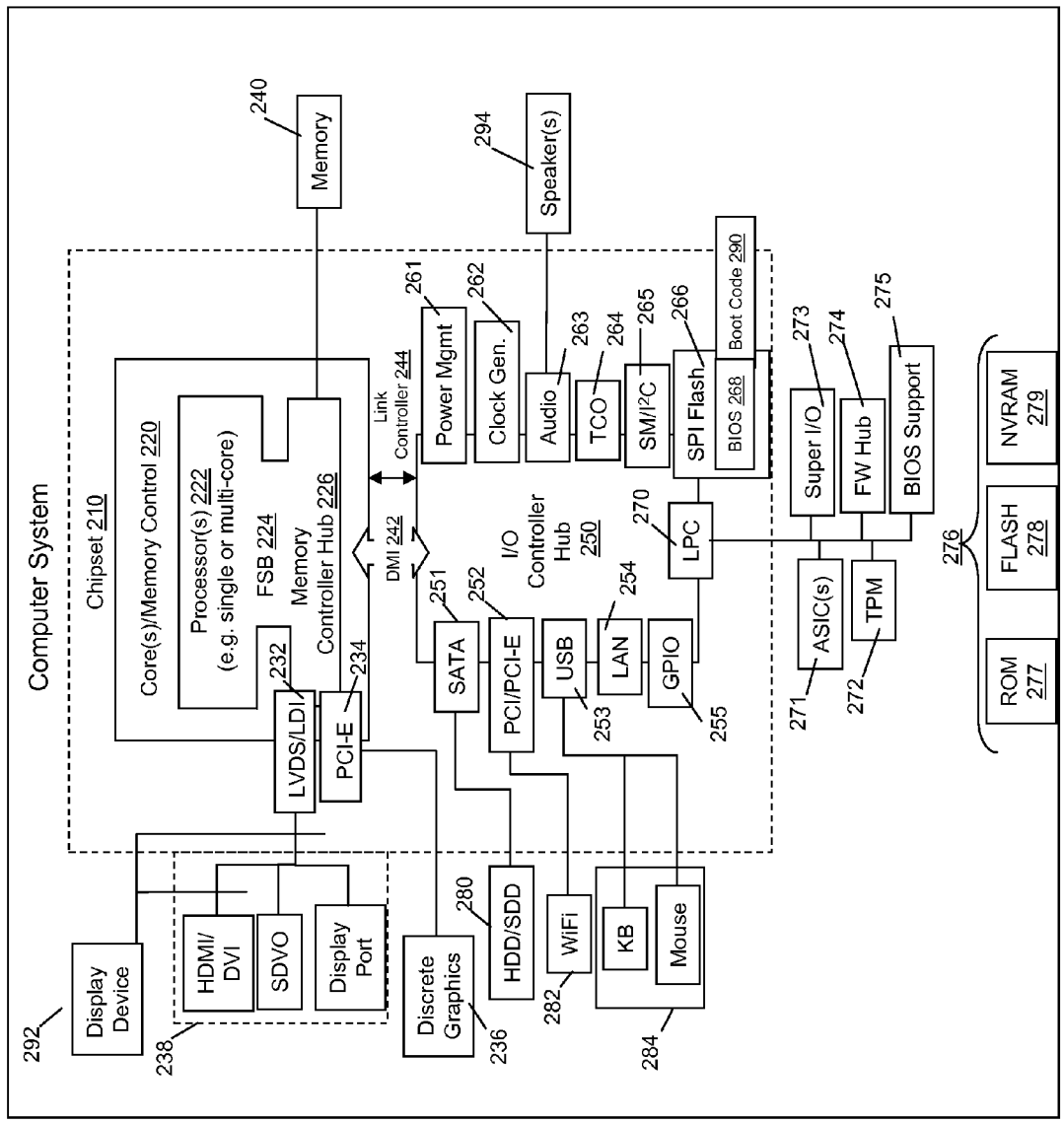
FIG. 2 illustrates another example of information handling device circuitry.

FIG. 2 depicts a block diagram of another example of information handling device circuits, circuitry or components. The example depicted in FIG. 2 may correspond to another type of end user device, such as computing systems of the THINKPAD series of personal computers sold by Lenovo (US) Inc. of Morrisville, N.C., or other devices, e.g., a service or other device providing an SSO service or portion thereof. As is apparent from the description herein, devices may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in connection with embodiments providing a SSO service that anticipates a user's needs and performs functions to reduce the time need to perform authentication, data retrieval and/or data transfer steps.

Figure 3:
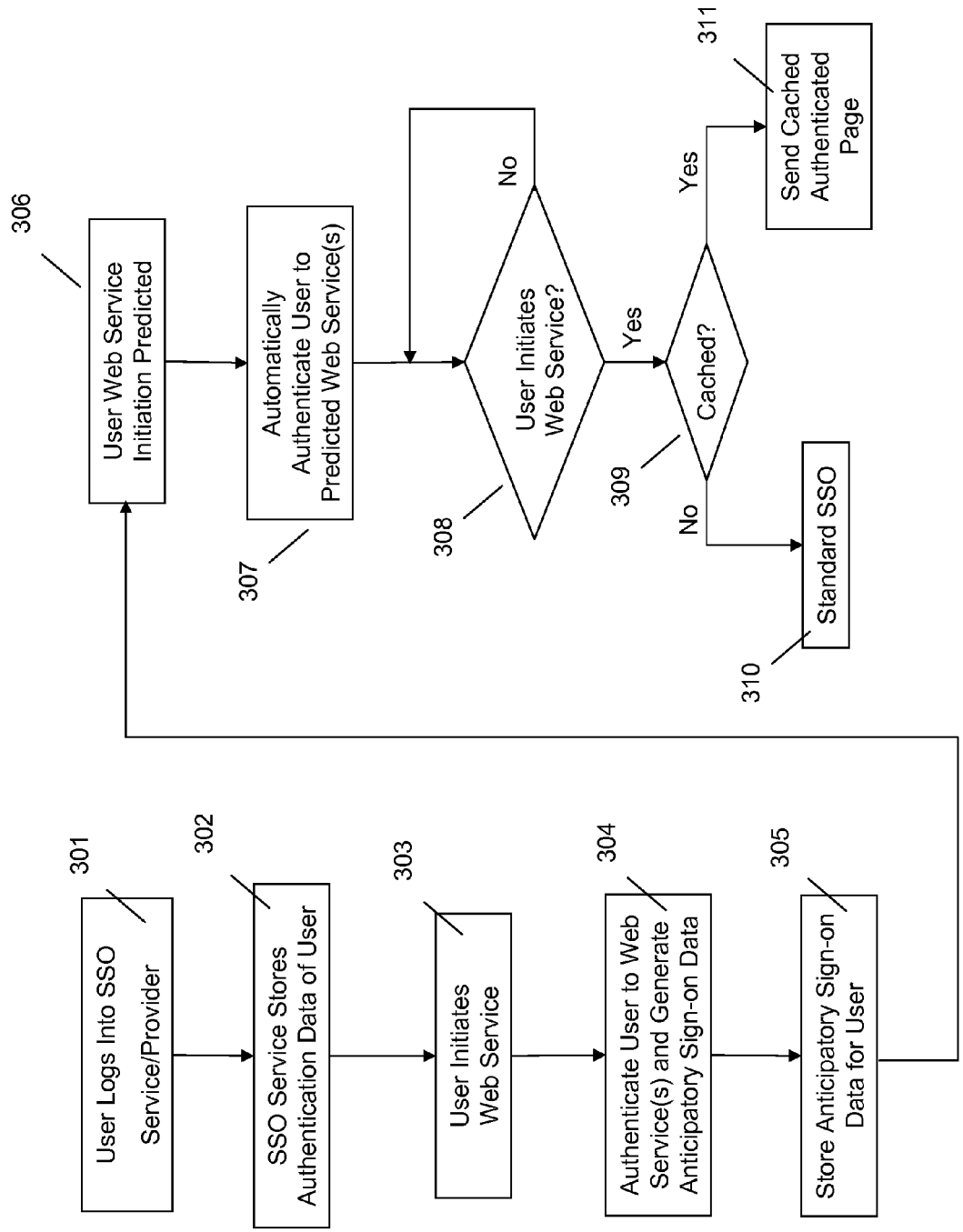
FIG. 3 illustrates an example method of anticipatory single sign-on for proxied web applications.

Referring to FIG. 3, in an embodiment, an end user device, e.g., smart phone, tablet, laptop, etc., sends authentication data of a user of a web service, such as by way of logging into an SSO service at 301 and thereafter providing authentication data to the SSO service for authenticating to an application, e.g., an email client application requiring log-in data. The SSO service may therefore store the user's authentication data for that web service at 302, per conventional arrangements. It is noted here that the SSO service may store the user's credentials or other authenticating data, e.g., derived from the user's credentials, and this storage may be either local or remote to the SSO service.

A user may then initiate a web service via the SSO service at 303, e.g., log in to the email application using a single sign on. Thus the SSO service receives one or more initiations for the web service(s) from the user at 303. This permits, in addition to a single sign on provided to the end user device, generation of anticipatory sign-on data for the user based on the one or more initiations for the web service at 304. That is, an embodiment may store anticipatory sign-on data that is derived from tracking the user's habits (e.g., signing into certain web services/applications at particular times, in particular combinations, in connection with particular roles, etc.). This allows an embodiment to store the anticipatory sign-on data at 305, e.g., for future use in predicting new initiations of web services.

As illustrated in FIG. 3, an embodiment may use the anticipatory sign-on data to predict a new initiation for the web service from the end user is expected at 306. For example, it may be known from the anticipatory sign-on data that the user is associated with a particular business role, e.g., sales, and further that in the morning at a particular time the user routinely signs into a work email client and a work sales enterprise application. Considering this determination, an embodiment may automatically authenticate the user to the web service(s) at 307, e.g., the work email application and the work sales enterprise application, prior to receiving the new initiation from the user. This front-loads or offsets in time the authentication and data retrieval needed to perform a single sign-on to these service(s) such that when the user does initiate the services, an embodiment will have already authenticated the user and cached the necessary information, reducing time delay.

There are many examples of what might be done in anticipation for an expected/predicted new initiation from the user. For example, the automatically authenticating may include retrieving a target web site of the web service predicted to be used, and providing the data for authenticating the user to the target web site ahead of time. This permits an embodiment to receive an authenticated web page in response to the authentication.

As may be appreciated then, when a user actually does provide a new initiation of a web service via the SSO service at 308, an embodiment may determine if the requested service has already been initiated in anticipation of the request, e.g., as illustrated at 309. If the data has been cached, an embodiment may substantially immediately transmit the data, e.g., an authenticated web page, to the end user device at 311. Otherwise, an embodiment may perform a conventional SSO procedure, as illustrated at 310.

The transmitting may occur prior to receipt of a new initiation at 308 because an embodiment has stored (or otherwise has access to) anticipatory sign-on data for the user. The nature of the anticipatory sign-on data is associated with the nature of the user (e.g., certain users may opt into tracking, etc.) and/or the nature of the web services (e.g., some web services may have known or learned associations, etc.). The anticipatory sign-on data may thus include pattern data of user initiations for a web service or services. This permits the predicting to be performed using the pattern data. As may be appreciated, the pattern data may be time based pattern data or other pattern data that permits predictions of which web service(s) a user might want, and when.

The anticipatory sign-on data may likewise include application relation data, e.g., data indicating that a work and personal applications are related or complementary, and thus the predicting and automatically authenticating may be performed for one or more complementary applications. As another example, the anticipatory sign-on data may include user role data, e.g., associated with a type of particular worker such as sales, managerial, etc., and therefore the predicting and automatically authenticating may be performed for one or more applications according to the user role data.

It is worth noting that the web services may take a variety of forms, e.g., authenticated web pages, protected data derived from applications, etc. Likewise, the SSO service may take a variety of forms, including a form that is distributed across various devices, e.g., the end user device and at least one other device.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, from an end user device, authentication data of a user of a web service;
   storing, in a single sign-on service, data for authenticating the user to the web service;
   receiving, at the single sign-on service, one or more initiations for the web service from the user;
   generating, using a processor, anticipatory sign-on data for the user based on the one or more initiations for the web service; and
   storing, at the single sign-on service, the anticipatory sign-on data.

2. The method of claim 1, further comprising:
   predicting, using the anticipatory sign-on data, a new initiation for the web service from the end user; and
   automatically authenticating the user to the web service prior to receiving the new initiation.

3. The method of claim 2, wherein the automatically authenticating comprises:
   retrieving a target web site of the web service; and
   providing the data for authenticating the user to the target web site.

4. The method of claim 3, further comprising:
   receiving an authenticated web page in response to the authentication; and
   transmitting the authenticated web page to the end user device.

5. The method of claim 4, wherein the automatically authenticating occurs prior to receipt of a new initiation.

6. The method of claim 2, wherein:
   the anticipatory sign-on data comprises pattern data of user initiations for a web service; and
   the predicting is performed using the pattern data.

7. The method of claim 6, wherein the pattern data is time based pattern data.

8. The method of claim 2, wherein:
   the anticipatory sign-on data comprises application data; and
   the predicting and automatically authenticating are performed for one or more associated applications.

9. The method of claim 2, wherein:
   the anticipatory sign-on data comprises user role data; and
   the predicting and automatically authenticating are performed for one or more applications according to the user role data.

10. The method of claim 1, wherein the web service is distributed across the end user device and at least one other device.

11. An information handling device, comprising:
    a processor; and
    a memory device that stores instructions executable by the processor to:
    receive, from an end user device, authentication data of a user of a web service;
    store, in a single sign-on service, data for authenticating the user to the web service;
    receive, at the single sign-on service, one or more initiations for the web service from the user;
    generate, using a processor, anticipatory sign-on data for the user based on the one or more initiations for the web service; and
    store, at the single sign-on service, the anticipatory sign-on data.

12. The information handling device of claim 11, wherein the instructions are further executable by the processor to:
    predict, using the anticipatory sign-on data, a new initiation for the web service from the end user; and
    automatically authenticate the user to the web service prior to receiving the new initiation.

13. The information handling device of claim 12, wherein to automatically authenticate comprises:
    retrieving a target web site of the web service; and
    providing the data for authenticating the user to the target web site.

14. The information handling device of claim 13, wherein the instructions are further executable by the processor to:
    receiving an authenticated web page in response to the authentication; and
    transmit the authenticated web page to the end user device.

15. The information handling device of claim 14, wherein transmission of the authenticated web page occurs prior to receipt of a new initiation.

16. The information handling device of claim 12, wherein:
    the anticipatory sign-on data comprises pattern data of user initiations for a web service; and
    the processor predicts a new initiation using the pattern data.

17. The information handling device of claim 16, wherein the pattern data is time based pattern data.

18. The information handling device of claim 12, wherein:
    the anticipatory sign-on data comprises application data; and
    the processor predicts a new initiation and automatically authenticates the user for one or more associated applications.

19. The information handling device of claim 12, wherein:
    the anticipatory sign-on data comprises user role data; and
    the processor predicts a new initiation and automatically authenticates the user to one or more applications according to the user role data.

20. A product, comprising:
    a storage device having code stored therewith, the code being executable by a processor and comprising:
    code that receives, from an end user device, authentication data of a user of a web service;
    code that stores, in a single sign-on service, data for authenticating the user to the web service;

code that receives, at the single sign-on service, one or more initiations for the web service from the user;
code that generates, using a processor, anticipatory sign-on data for the user based on the one or more initiations for the web service; and
code that stores, at the single sign-on service, the anticipatory sign-on data.

\* \* \* \* \*